(12) United States Patent
Kim et al.

(10) Patent No.: US 12,262,126 B2
(45) Date of Patent: Mar. 25, 2025

(54) VISION SENSOR AND IMAGE PROCESSING DEVICE INCLUDING THE SAME

(71) Applicant: SAMSUNG ELECTRONICS CO., LTD., Suwon-si (KR)

(72) Inventors: Junseok Kim, Suwon-si (KR); Raeyoung Kim, Suwon-si (KR); Keunjoo Park, Suwon-si (KR); Jaeha Park, Suwon-si (KR); Junhyuk Park, Suwon-si (KR); Jiwon Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 18/218,902

(22) Filed: Jul. 6, 2023

(65) Prior Publication Data

US 2024/0107188 A1    Mar. 28, 2024

(30) Foreign Application Priority Data

Sep. 23, 2022   (KR) ........................ 10-2022-0121005

(51) Int. Cl.
| | | |
|---|---|---|
| *H04N 25/47* | (2023.01) | |
| *H04N 23/45* | (2023.01) | |
| *H04N 25/707* | (2023.01) | |
| *H04N 25/766* | (2023.01) | |
| *H04N 25/77* | (2023.01) | |
| *H04N 25/79* | (2023.01) | |

(52) U.S. Cl.
CPC ............. *H04N 25/47* (2023.01); *H04N 25/77* (2023.01)

(58) Field of Classification Search
CPC ........ H04N 25/47; H04N 25/77; H04N 25/53; H04N 25/75; H04N 25/766; H04N 25/79; H04N 25/707; H04N 23/45
See application file for complete search history.

(56) References Cited

U.S. PATENT DOCUMENTS

| | | | |
|---|---|---|---|
| 7,728,269 B2 | 6/2010 | Lichtsteiner et al. | |
| 9,521,337 B1 * | 12/2016 | Shen | H04N 25/77 |
| 10,248,222 B2 | 4/2019 | Lee et al. | |
| 10,715,750 B2 | 7/2020 | Berner et al. | |
| 10,972,691 B2 | 4/2021 | Yeo et al. | |
| 11,280,918 B2 * | 3/2022 | Nishihara | G01T 1/2026 |
| 11,303,804 B2 | 4/2022 | Sironi et al. | |
| 11,812,169 B2 * | 11/2023 | Brandli | H04N 25/47 |

(Continued)

FOREIGN PATENT DOCUMENTS

WO    2020/229981 A1    11/2020

*Primary Examiner* — Marly S Camargo
(74) *Attorney, Agent, or Firm* — Sughrue Mion, PLLC

(57) ABSTRACT

A pixel of a vision sensor includes a photoelectric converter configured to convert an optical signal into a current, a current-to-voltage converter configured to convert the current into a first voltage, an amplifier configured to generate an output voltage by amplifying a voltage level of the first voltage, at least one comparator configured to identify whether an event occurs based on comparing the output voltage with at least one threshold voltage, and generate an event signal based on identifying that the event occurs, and at least one counter configured to receive the event signal from the at least one comparator, obtain a count value by counting the event signal as information about an amount of change in illumination, and transmit output data comprising the count value.

20 Claims, 11 Drawing Sheets

(56) References Cited

U.S. PATENT DOCUMENTS

| | | | | |
|---|---|---|---|---|
| 12,063,444 | B1 * | 8/2024 | Schon | H04N 25/77 |
| 12,069,352 | B2 * | 8/2024 | Baek | H04N 25/47 |
| 12,107,553 | B2 * | 10/2024 | Choi | H04N 25/50 |
| 2016/0093273 | A1 | 3/2016 | Wang et al. | |
| 2020/0410272 | A1 * | 12/2020 | Seo | G06V 10/22 |
| 2022/0166948 | A1 | 5/2022 | Kelly et al. | |
| 2023/0008577 | A1 * | 1/2023 | Niwa | H04N 25/77 |

* cited by examiner

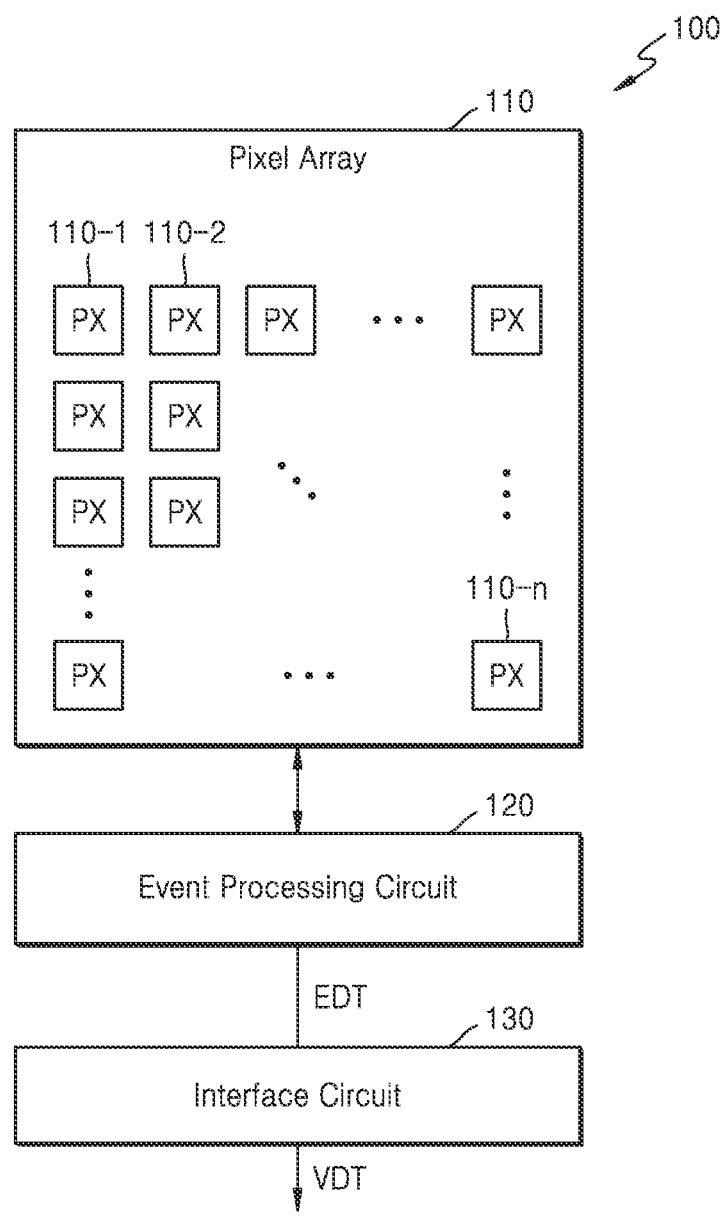

VISION SENSOR AND IMAGE PROCESSING DEVICE INCLUDING THE SAME

CROSS-REFERENCE TO RELATED APPLICATION

This application is based on and claims priority to Korean Patent Application No. 10-2022-0121005, filed on Sep. 23, 2022, in the Korean Intellectual Property Office, the disclosure of which is incorporated herein by reference in its entirety.

BACKGROUND

1. Field

Example embodiments of the disclosure relate to a vision sensor, and more particularly, to a vision sensor including a reset circuit and an event counter, and an image processing device including the same.

2. Description of Related Art

Human-computer interaction (HCI) is expressed in the user interface. A variety of user interfaces that recognize user input may provide natural interaction between humans and computers. Various sensors may be used to recognize user input.

A vision sensor (e.g., a dynamic vision sensor) may sense a change in intensity of ambient light or a change in illumination, may generate information on an event (i.e., an event signal) when the amount of change in the intensity or illumination of light is greater than a threshold value, and may deliver the generated event signal to a processor.

In related art, the dynamic vision sensor may only identify whether an event occurs by comparing an output voltage to a threshold voltage level at each pixel, and an amount of change in illumination for the occurrence of the event may not be able to be identified.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a vision sensor capable of effectively processing an image based on illumination change amount information about an acquired event.

Additional aspects will be set forth in part in the description which follows and, in part, will be apparent from the description, or may be learned by practice of the presented embodiments.

According to an aspect of an example embodiment, a pixel of a vision sensor may include a photoelectric converter configured to convert an optical signal into a current, a current-to-voltage converter configured to convert the current into a first voltage, an amplifier configured to generate an output voltage by amplifying a voltage level of the first voltage, at least one comparator configured to identify whether an event occurs based on comparing the output voltage with at least one threshold voltage, and generate an event signal based on identifying that the event occurs, and at least one counter configured to receive the event signal from the at least one comparator, obtain a count value by counting the event signal as information about an amount of change in illumination, and transmit output data comprising the count value.

According to an aspect of an example embodiment, an image processing device may include a vision sensor, and an image sensor. The vision sensor may include a photoelectric converter configured to convert an optical signal into an electrical signal, an amplifier configured to generate an output voltage by amplifying the electrical signal, at least one comparator configured to identify whether an event occurs based on comparing the output voltage with at least one threshold voltage and generate an event signal based on identifying that the event occurs, and at least one counter configured to receive the event signal from the at least one comparator, obtain a count value by counting the event signal as information about an amount of change in illumination, and transmit output data comprising the count value.

According to an aspect of an example embodiment, a pixel of a vision sensor may include a photoelectric converter configured to convert an optical signal into a current, a comparator configured to identify whether an event occurs based on comparing an output voltage corresponding to the current with at least one threshold voltage level, and generate an event signal based on identifying that the event occurs, and a reset circuit configured to reset the output voltage based on the event signal being generated, where the event signal comprises an ON event signal and an OFF event signal.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 2 is a diagram illustrating a vision sensor according to an embodiment;

DETAILED DESCRIPTION

Figure 1:
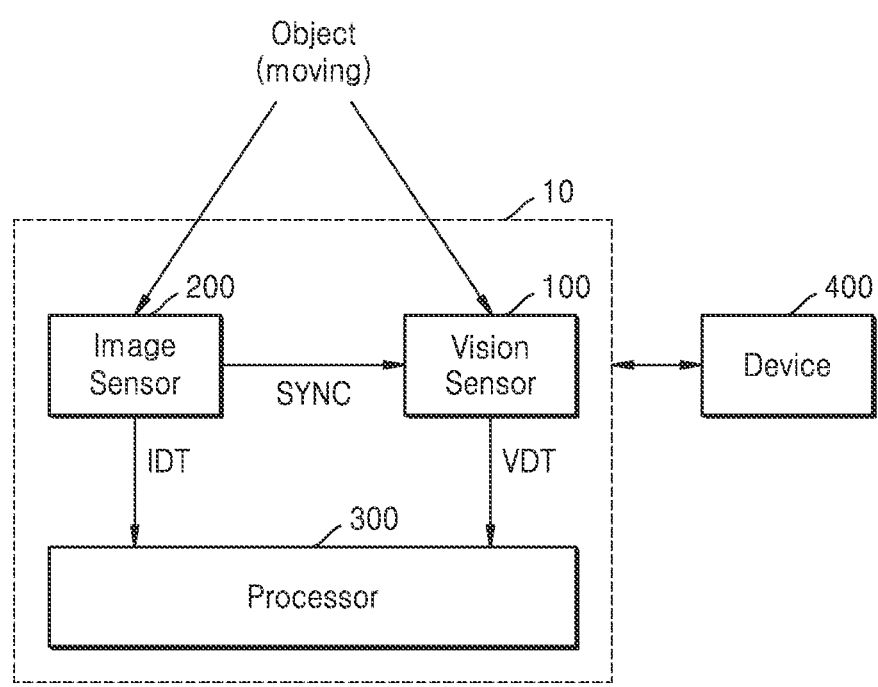
FIG. 1 is a diagram illustrating an image processing device according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating an image processing device 10 according to an embodiment.

Referring to FIG. 1, the image processing device 10 may include a vision sensor 100, an image sensor 200, and a processor 300. The image processing device 10 according to an embodiment may be mounted in an electronic device having an image or light sensing function. For example, the image processing device 10 may be mounted in electronic devices, such as cameras, smartphones, wearable devices, Internet of things (IoT) devices, tablet personal computers (PCs), personal digital assistants (PDAs), portable multimedia players (PMPs), navigation devices, drones, and advanced driver assistance systems (ADAS). In addition, the image processing device 10 may be provided as a component in vehicles, furniture, manufacturing facilities, doors, and various measuring devices.

The vision sensor 100 may detect a change in intensity of incident light and output an event signal. The vision sensor 100 may be a dynamic vision sensor that outputs event signals for pixels in which a change in intensity of light is sensed (i.e., to pixels in which an event occurs). The change in intensity of light may be caused by movement of an object imaged by the vision sensor 100, movement of the vision sensor 100 and/or movement of the image processing device 10 itself. The vision sensor 100 may periodically or aperiodically transmit vision sensor data VDT including event signals to the processor 300.

The vision sensor 100 may generate a time stamp matching an image frame generated by the image sensor 200 to an event signal generated by the vision sensor 100 based on a synchronization signal SYNC received from the image sensor 200. The vision sensor 100 may also transmit the vision sensor data VDT including the generated time stamp to the processor 300. The time stamp may include information about a time point at which the image sensor 200 is exposed, a time point at which an image frame is generated, or a time point at which an event signal of the vision sensor 100 is generated.

For example, the vision sensor 100 may transmit the vision sensor data VDT including information about whether an event occurs and the amount of change in illumination caused by the event, to the processor 300 using a self-reset circuit and a counter included in each pixel of the vision sensor 100.

In addition, the vision sensor 100 may output a device synchronization signal for synchronizing external devices, including the image sensor 200, to the vision sensor 100 using a synchronization signal SYNC received from the image sensor 200 or an internal signal of the vision sensor 100. The vision sensor 100 may output a plurality of device synchronization signals and individually control the device synchronization signals.

The image sensor 200 may convert an optical signal of an object incident through an optical lens into an electrical signal, generate image data IDT based on the electrical signals, and output the image data IDT. The image sensor 200 may include, for example, a pixel array including a plurality of two-dimensionally arranged pixels and a readout circuit, and the pixel array may convert received optical signals into electrical signals. The pixel array may be implemented as a photoelectric transformation element, such as charge-coupled devices (CCDs) or complementary metal oxide semiconductors (CMOS), and may also be implemented as various other types of photoelectric transformation elements. The readout circuit may generate raw data based on an electrical signal provided from the pixel array, and may output, as the image data IDT, the raw data or other raw data that has undergone preprocessing, such as raw data removed from a bad pixel. The image sensor 200 may be implemented as a semiconductor chip or package including a pixel array and a readout circuit.

The image sensor 200 may generate the synchronization signal SYNC to be transmitted to the vision sensor 100 in order to synchronize the vision sensor 100 with the image sensor 200. The synchronization signal SYNC may be generated considering (e.g., based on) shutter signal information, readout signal information, or image frame information of the image sensor 200.

The processor 300 may perform image processing on the image data IDT provided from the image sensor 200. For example, the processor 300 may perform image processing of changing a data format of the image data IDT (for example, changing image data of a Bayer pattern into a YUV or RGB format), image processing for improving image quality, such as removing noise, adjusting brightness, and adjusting sharpness, and the like. The processor 300 may process the vision sensor data VDT received from the vision sensor 100, and may detect movement of an object (or movement of an object on an image recognized by the image processing device 10) based on an event signal in the vision sensor data VDT.

In addition, the processor 300 may match the image frame included in the image data IDT provided from the image sensor 200 to the vision sensor data VDT received from the vision sensor 100 using a time stamp and pieces of synchronization signal information.

For example, the processor 300 may effectively apply an algorithm (e.g., CMOS image sensor (CIS) deblur algorithm) for removing motion blur due to the movement of the object from the image data by matching the vision sensor data VDT, including information about whether an event occurs and the amount of change in illumination caused by the event, to the image sensor data IDT using the time stamp and the synchronization signal information.

The processor 300 may include an application specific integrated circuit (ASIC), a field-programmable gate array (FPGA), a dedicated microprocessor, a microprocessor, a general purpose processor, and the like. In an embodiment, the processor 300 may be an application processor or an image signal processor.

Each of the vision sensor 100, the image sensor 200, and the processor 300 may be implemented as an integrated circuit (IC). For example, the vision sensor 100, the image sensor 200, and the processor 300 may be implemented as separate semiconductor chips. Alternatively, the vision sensor 100, the image sensor 200, and the processor 300 may be implemented as a single chip. For example, the vision sensor 100, the image sensor 200, and the processor 300 may be implemented as a system on chip (SoC).

The image processing device 10 may control the external device 400 to collect data. The image processing device 10 may match data collected from the external device 400 using the time stamp. The external device 400 may include an acceleration sensor, an inertial measurement unit (IMU), a gyro sensor, an infrared (IR) LED, and a flash light.

FIG. 2 is a diagram illustrating a vision sensor according to an embodiment.

Referring to FIGS. 1 and 2, the vision sensor 100 may include a pixel array 110, an event processing circuit 120 and an interface circuit 130.

The pixel array 110 may include a plurality of pixels PX (e.g., 110-1 to 110-*n*) arranged in a matrix form. The pixel PX shown in FIG. 2 may correspond to the pixels described later with respect to FIGS. 3A-9. Each of the pixels PX may detect events in which the intensity of received light increases or decreases. For example, each of the pixels PX may be connected to the event processing circuit 120 through a column line extending in a column direction and a row line extending in a row direction. A signal indicating that an event occurs and polarity information of the event (that is, whether the event is an ON event in which the intensity of light increases or an OFF event in which the intensity of light decreases) may be output from the pixel in which the event occurs to the event processing circuit 120.

The event processing circuit 120 may read events from the pixel array 110 and process the events. The event processing circuit 120 may generate event data EDT including polarity information of the event that occurs, an address of the pixel in which the event occurs, and a time stamp. The event processing circuit 120 may process the events occurring in the pixel array 110 in units of pixels, units of pixel groups including a plurality of pixels, units of columns, or units of frames.

The event processing circuit 120 may include a column scanner circuit, a row event readout circuit, an address event representation (AER), an event signal processor (ESP), and a bias generator.

The column scanner circuit of the event processing circuit 120 may scan the pixels PX constituting the pixel array in units of columns. The column scanner circuit may transmit a selection signal to a column, among a plurality of columns of the pixel array, to scan the pixels PX included in the column.

The pixels PX included in the scanned column may transmit, to an event readout circuit, polarity information indicating whether an event occurs in which the intensity of light increases or decreases in response to the selection signal.

The row event readout circuit of the event processing circuit 120 may receive polarity information from pixels PX included in the scanned column. The row event readout circuit may transmit a reset signal RST to a pixel PX in which an event (e.g., an ON event or an OFF event) occurs in response to the polarity information. The pixel PX in which the event occurs may be reset in response to the reset signal RST.

The ESP of the event processing circuit 120 may generate event data EDT based on an address ADDR, polarity information, and time stamp TS received from the AER.

The interface circuit 130 may receive the event data EDT and a time stamp, and may transmit the vision sensor data VDT to the processor 300 according to a set protocol. The interface circuit 130 may generate vision sensor data VDT by packing the event data EDT and the time stamp in individual signal units, packet units, or frame units according to a set protocol, and may transmit the vision sensor data VDT to the processor 300. For example, the interface circuit 130 may include one of an AER interface, a mobile industry processor interface (MIPI) interface, and a parallel interface.

A packet including at least one event data EDT and the time stamp may be output as the vision sensor data VDT from the interface circuit 130. The packet may include a time stamp and address of the event data EDT and polarity information, and the arrangement order is not limited. A header indicating the start of the packet may be added to a front end of the packet and a tail indicating the end of the packet may be added to a rear end of the packet. The packet may include at least one event signal.

As described above, when an event occurs, the pixel PX of the vision sensor may require a pixel reset to detect a next event. However, because the pixel PX may be reset only when a reset signal is received from an external device (e.g., the event processing circuit 120), the reset may be delayed due to latency of the reset signal, and thus, an event occurrence time point or an output voltage may be distorted.

The pixel of a vision sensor according to an embodiment performs event sensing in real-time through self-resetting due to a structural feature of including a counter and a reset circuit in each pixel itself, and counts the amount of change in illumination that causes an event, as well as whether an event occurs, as a count value, and transmits the count value as output data of the vision sensor. A structure of the pixel according to an embodiment is described with reference to FIG. 3A below. In the disclosure, the amount of change in illumination for an event may refer to the amount of change in illumination that has caused the event.

Figure 3A:
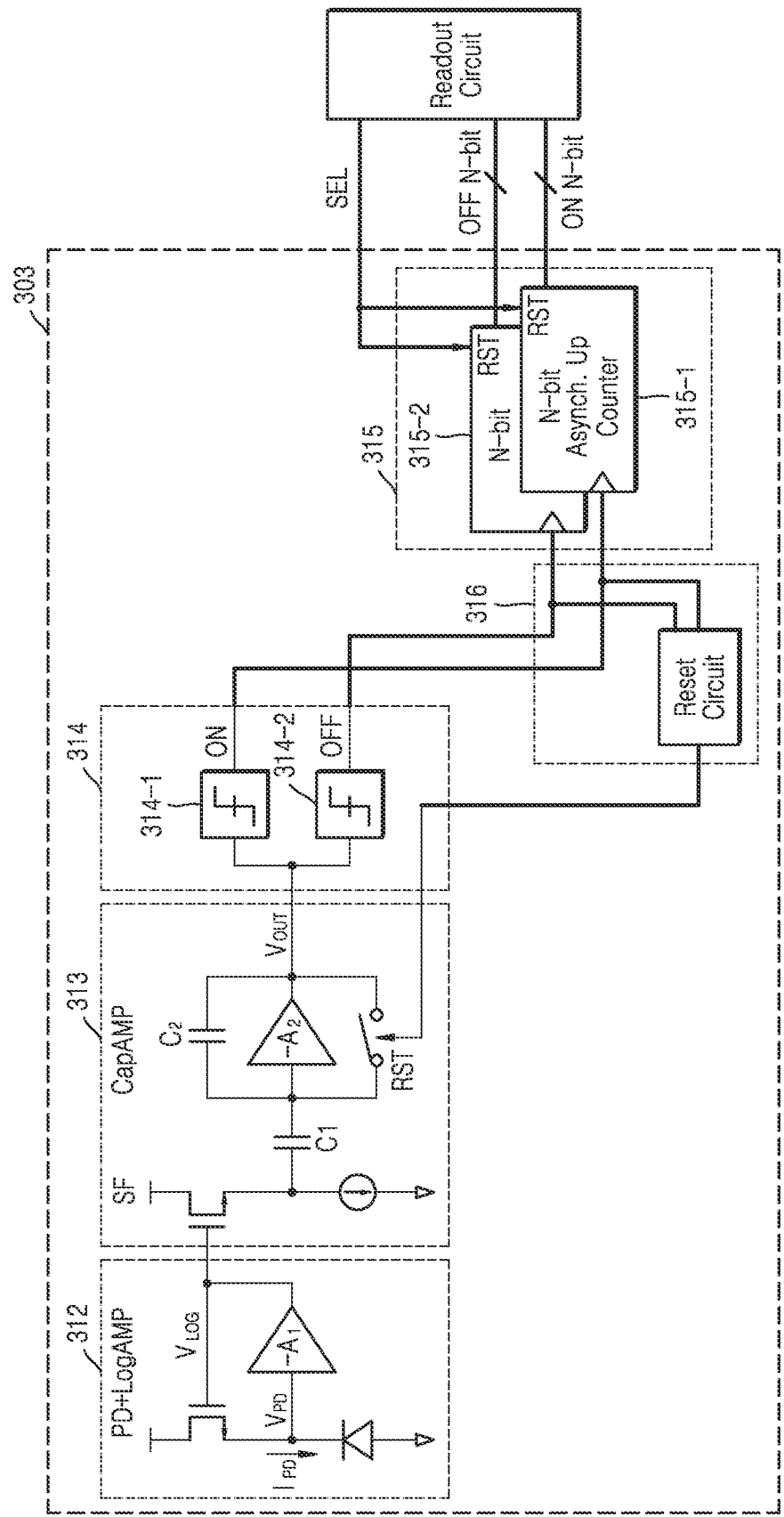
FIG. 3A is a diagram illustrating a pixel according to an embodiment.

FIG. 3A is a diagram illustrating a pixel 303 according to an embodiment.

Referring to FIG. 3A, the pixel 303 may include a current-to-voltage converter circuit 312 including a photoelectric transformation element, an amplifier circuit 313, a comparator circuit 314, a counter 315, and a reset circuit 316.

The photoelectric transformation element (e.g., a photodiode) included in the current-to-voltage converter circuit 312 may convert incident light (i.e., an optical signal) into an electrical signal (e.g., a current $I_{PD}$). The photoelectric transformation element may include, for example, a photodiode, a phototransistor, a photo gate, or a pinned photodiode. The photoelectric transformation element may generate an electrical signal having a higher level as the intensity of incident light increases.

The current-to-voltage converter circuit 312 may convert the current $I_{PD}$ generated by the photoelectric transformation element into a voltage, and may amplify a voltage level of the voltage to generate a log voltage $V_{LOG}$ in a log scale. The current-to-voltage converter circuit 312 may include a logarithmic amplifier and a feedback transistor.

Additionally, the pixel 303 may further include a source-follower buffer SF in the amplifier circuit 313. The source follower SF may be used to prevent kick-back noise from the amplifier circuit 313 to the current-to-voltage converter circuit 312, and drive a first capacitor $C_1$ or a second capacitor $C_2$ of the amplifier circuit 313. When the source follower SF is provided, the log voltage $V_{LOG}$ may be input to the source follower SF, and a source follower voltage $V_{SF}$ may be generated.

The amplifier circuit 313 may amplify the log voltage $V_{LOG}$ (or source follower voltage $V_{SF}$) to generate an output voltage $V_{OUT}$. The amplifier circuit 313 may include the first capacitor $C_1$, the second capacitor $C_2$, a differentiator amplifier, and a switch SW. The first capacitor $C_1$ and the second capacitor $C_2$ may store charges corresponding to an output generated by the photoelectric transformation element. The differentiator amplifier may amplify the amount of change in the log voltage $V_{LOG}$ (or the source follower voltage $V_{SF}$) during a certain period of time to generate an output voltage $V_{OUT}$, and a feedback circuit may be connected between an input terminal and an output terminal of the differentiator amplifier.

The switch SW may be located on the feedback circuit and turned on or off based on the reset signal RST. When an event signal (e.g., an ON event signal or an OFF event signal) is generated, the switch SW may be turned on in response to receiving a reset signal by the reset circuit 316 in the pixel 303.

For example, when the switch SW is turned on, the output voltage $V_{OUT}$ may be reset as voltages across the differentiator amplifier become the same. That is, the differentiator amplifier may amplify the amount of change in the log voltage $V_{LOG}$ (or the source follower voltage $V_{SF}$) of an event that occurs at a time from a time point at which the output voltage $V_{OUT}$ is reset according to the reset signal RST to generate the output voltage $V_{OUT}$.

The amplifier circuit 313 may be implemented as having a negative gain (e.g., "$-A_2$"), such that when the log voltage $V_{LOG}$ (or the source follower voltage $V_{SF}$) increases (i.e., when the intensity of light increases), the output voltage $V_{OUT}$ may decrease, and when the log voltage $V_{LOG}$ (or the source follower voltage $V_{SF}$) decreases (i.e., when the intensity of light decreases), the output voltage $V_{OUT}$ increases. However, the disclosure is not limited thereto, and the amplifier circuit 313 may be implemented to have a positive gain.

The comparator circuit 314 may generate an event signal indicating the occurrence of an event when the amount of change in light incident on the photoelectric transformation element is greater than or equal to a predetermined change level. The comparator circuit 314 may compare the output voltage $V_{OUT}$ from the amplifier circuit 313 with a threshold voltage, and generate event signals (ON, OFF) having active levels according to a comparison result.

For example, the comparator circuit 314 may include a first comparator 314_1 comparing the output voltage $V_{OUT}$ with a first threshold voltage level VTH1 and generating an ON event signal indicating whether an ON event occurs according to the comparison result. The comparator circuit 314 may include a second comparator 314_2 comparing the output voltage $V_{OUT}$ with a second threshold voltage level VTH2 and generating an OFF event signal indicating whether an OFF event occurs according to the comparison result. The first threshold voltage level VTH1 may be the same as or different from the second threshold voltage level VTH2.

When the output voltage $V_{OUT}$ reaching the first threshold voltage VTH1, the first comparator 314_1 may generate an ON event signal indicating that an ON event occurs; when the output voltage $V_{OUT}$ reaching the second threshold voltage VTH2, the second comparator 314_2 may generate an OFF event signal indicating that an OFF event occurs. For example, when the amplifier circuit 313 is implemented as having a negative gain (e.g., "$-A_2$") and the output voltage $V_{OUT}$ is lower than the first threshold voltage VTH1, the first comparator 314_1 may generate an ON event signal indicating that an ON event occurs. Furthermore, when the output voltage $V_{OUT}$ of the second comparator 314_2 is higher than the second threshold voltage VTH2, the second comparator 314_2 may generate an OFF event signal indicating that an OFF event occurs. In this case, the magnitude of the first threshold voltage level VTH1 may be smaller than the magnitude of the second threshold voltage level VTH2.

The counter 315 may hold and count the ON event signal and the OFF event signal output from the comparator circuit 314, and output a counting result (e.g., count value) to an external device.

For example, the counter 315 may include a first event counter (e.g., an ON event counter) 315_1 receiving the ON event signal output from the first comparator 314_1 as an input signal and a second event counter (e.g., an OFF event counter) 315_2 receiving the OFF event signal output from the second comparator 314_2 as an input signal.

For example, the first event counter 315_1 may increase the first count value whenever the ON event signal is received. In this case, the first count value may refer to a value for representing the amount of change in illumination for the ON event. The amount of change in illumination for the ON event may refer to the amount of change in illumination that has caused the ON event.

For example, the second event counter 315_2 may increase the second count value whenever the OFF event signal is received. In this case, the second count value may refer to a value indicating the amount of change in illumination for the OFF event. The amount of change in illumination for the OFF event may refer to the amount of change in illumination that causes the OFF event.

For example, when a maximum count value MAX is reached, the counter 315 may not increase the count value and may maintain a previous count value even when the ON event signal or the OFF event signal is received.

When the pixel 303 is scanned, the counter 315 may output counting result data (e.g., a count value) based on the ON event signal and the OFF event signal. For example, the counter 315 may transmit first output data (ON N-bit) for a first count value for the ON event and second output data (OFF N-bit) including a second count value for the OFF event to an external device (e.g. a readout circuit). As the counter 315 receives a scan signal (e.g., SEL) from an external device, the counter 315 may output a count value and reset the count value to '0'.

The reset circuit 316 may be located inside the pixel 303 and may be referred to as a self-reset circuit. When either the ON event signal or the OFF event signal occurs, the reset circuit 316 may generate the reset signal RST and may transmit the reset signal RST to the amplifier circuit 313 such that the pixel 303 may be reset.

The reset circuit 316 may include an OR gate and a reset signal generator. For example, the OR gate may be electrically connected to the first comparator 314_1, the second comparator 314_2 and the amplifier circuit 313. The OR gate may receive input signals from the first comparator 314_1 and the second comparator 314_2, and may transmit the reset signal RST as an output signal to the amplifier circuit 313. In this case, the input signal may refer to any one of the ON event signal and the OFF event signal.

For example, the reset signal RST may be generated as a signal having a refractory period. In order to prevent unnecessary resetting of the switch SW, the reset signal RST may have a refractory period of a certain period until the switch SW is opened again after the switch SW is reset. However, the disclosure is not limited thereto, and the reset signal RST may be transmitted to the amplifier circuit 313 without the refractory period.

For example, the amplifier circuit 313 may turn on the switch SW disposed on the feedback circuit of the amplifier circuit 313, in response to receiving the reset signal RST.

When the switch SW is turned on, the output voltage $V_{OUT}$ may be reset as voltages across the differentiator amplifier of the amplifier circuit 313 become the same. That is, the differentiator amplifier may amplify the amount of change in the log voltage $V_{LOG}$ (or the source follower voltage $V_{SF}$) from a time point at which the output voltage $V_{OUT}$ is reset according to the reset signal RST to generate the output voltage $V_{OUT}$ for a next event.

When an event occurs, the pixel of a dynamic vision sensor (DVS) according to an embodiment may store the amount of change in illumination for the corresponding event as a count value in the counter for each event (e.g., the ON event or OFF event), thereby precisely analyzing movement of an object based on the amount of change in illumination for each event to perform image processing.

In addition, a vision sensor according to an embodiment may detect both the ON event and the OFF event occurring within one frame period, and output data on the amount of change in illumination for each event to an external device. For example, when a flicker event in which an ON event and an OFF event repeatedly and quickly occur occurs, an image processing device including a DVS pixel according to an embodiment may filter the flicker event through count values of the ON event counter and the OFF event counter of the pixel, thereby effectively removing the flicker event during an image processing process.

Figure 3B:
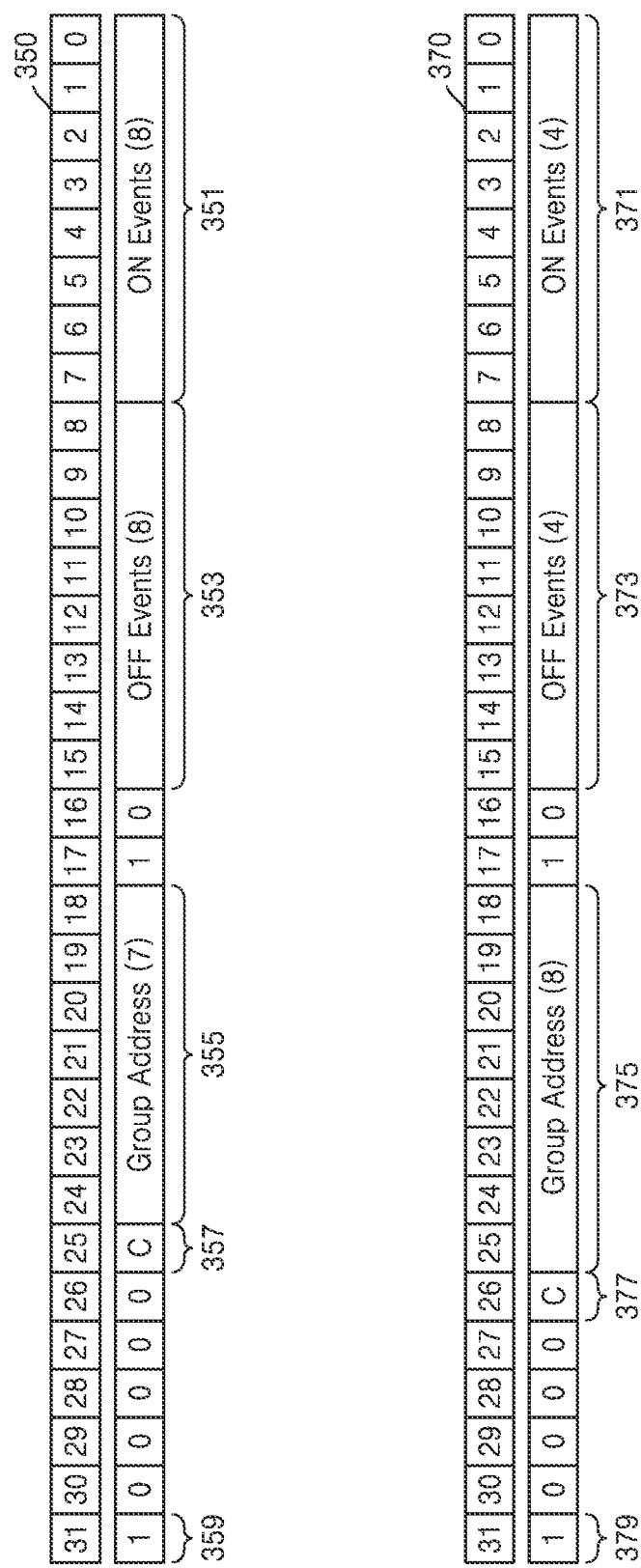
FIG. 3B is a diagram illustrating a packet format for output data of a pixel group according to an embodiment.

FIG. 3B is a diagram illustrating a packet format for output data of a pixel group according to an embodiment. A first packet format 350 is a packet format according to a comparative example, and a second packet format 370 is an example of a packet format according to an embodiment.

The first packet format 350 may be a packet format for output data of a vision sensor including pixels that do not include a reset circuit and a counter inside the pixel, and the second packet format 370 may be a packet format for output data of a vision sensor including pixels including a reset circuit and a counter inside the pixel.

The first packet format 350 may include an ON event field 351, an OFF event field 353, a group address value field 355, a channel ID 357 of a multi-DVS case, and an indicator 359 of a group packet.

In the first packet format 350, each pixel group may include 8 pixels (e.g., first to eighth pixels). In this case, the ON event field 351 may indicate whether an ON event occurs in each of the eight pixels (e.g., the first to eighth pixels) by allocating 1 bit per pixel. The OFF event field 353 may indicate whether an OFF event occurs in each of the eight pixels (e.g., the first to eighth pixels) by allocating 1 bit per pixel. For example, field #0 (i.e., a bit labeled 0 shown in FIG. 3B) of the first packet format 350 may indicate whether an ON event occurs in a first pixel of a target pixel group, and field #8 (i.e., a bit labeled 8 shown in FIG. 3B) of the first packet format 350 may indicate whether an OFF event occurs in the first pixel of the target pixel group.

For example, field #0 of the first packet format 350 may have a value of 0 and 1, and may indicate whether an ON event occurs in the first pixel of the target pixel group.

For example, field #8 of the first packet format 350 may have a value of 0 and 1, and may indicate whether an OFF event occurs in the first pixel of the target pixel group.

The group address value field 355 may indicate an address of a target pixel group, among all pixel groups. For example, in the case of a vision sensor including a total of 720 pixels, each pixel group may include 8 pixels, and thus, there are a total of 90 pixel groups, and the group address value field 355 for indicating each pixel group may include 7 bits.

The second packet format 370 may include an ON event field 371, an OFF event field 373, a group address value field 375, a channel ID 377 of a multi-DVS case, and an indicator 379 of a group packet.

In the second packet format 370, each pixel group may include 4 pixels (e.g., first to fourth pixels). In this case, the ON event field 371 may be indicated by allocating 2 bits per pixel to each of the four pixels (e.g., the first to fourth pixels). The OFF event field 373 may be indicated by allocating 2 bits per pixel to each of the four pixels (e.g., the first to fourth pixels).

For example, fields #0 and #1 of the second packet format 370 may indicate whether an ON event occurs and the amount of change in illumination for the ON event in the first pixel of the target pixel group, and fields #8 and #9 of the second packet format 370 may indicate whether an OFF event occurs and the amount of change in illumination for the OFF event in the first pixel of the target pixel group.

For example, fields #0 and #1 of the second packet format 370 may have a value of any one of '00', '01', '10', and '11', and may indicate whether an ON event occurs and the amount of change in illumination for the ON event of the first pixel of the target pixel group based on the four types of values. The maximum count value MAX of the ON event counter may be '11'.

For example, fields #8 and #9 of the second packet format 370 may have a value of any one of '00', '01', '10', and '11', and may indicate whether an OFF event occurs and the amount of change in illumination for the OFF event of the first pixel of the target pixel group. A maximum count value MAX of the OFF event counter may be '11'.

The group address value field 375 may indicate an address of a target pixel group, among all pixel groups. For example, in the case of a vision sensor including a total of 720 pixels, each pixel group may include 4 pixels, such that there are a total of 120 pixel groups, and the group address value field 375 for representing each pixel group may include 8 bits.

Because the pixel of the vision sensor according to an embodiment includes the reset circuit and the counter therein, the pixel may generate output data including event information about the amount of change in illumination that has caused an event, as well as whether the corresponding event occurs within one frame period, and may use a corresponding packet format (e.g., the second packet format).

Figure 4:
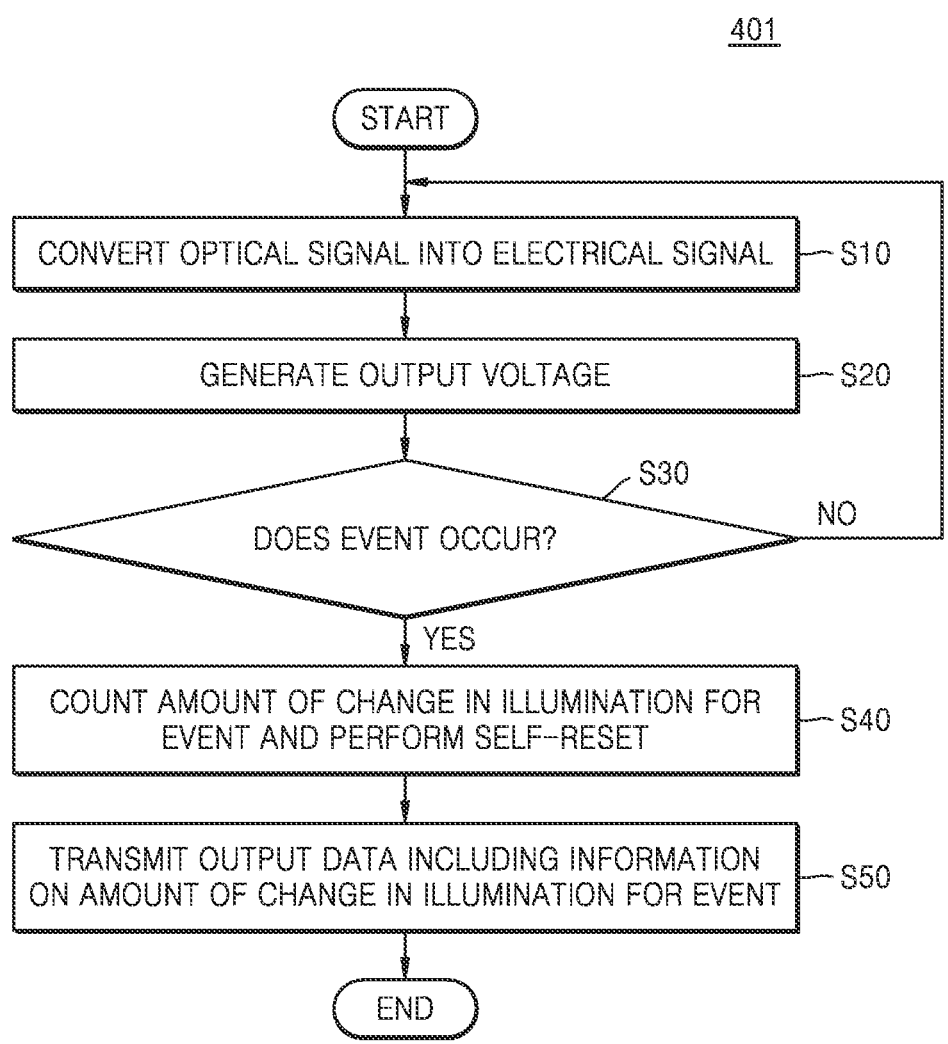
FIG. 4 is a flowchart illustrating a method of operating a pixel, according to an embodiment.

FIG. 4 is a flowchart 401 illustrating a method of operating a pixel, according to an embodiment.

FIG. 4 is a diagram illustrating an operation of identifying whether an event occurs, performed in the pixel 303 of FIG. 3A, and an operation of counting the amount of change in illumination caused by an event.

Referring to FIG. 4, the event identification operation and the counting operation for the generated amount of change in illumination may include operations S10, S20, S30, S40, and S50.

In operation S10, the pixel may convert an optical signal into an electrical signal.

For example, the photoelectric transformation element of the pixel may transform an optical signal into an electrical signal, such as current $I_{PD}$, according to the intensity of light. The current-to-voltage converter circuit 312 of the pixel may convert the generated current $I_{PD}$ into a voltage and amplify a voltage level to generate a log voltage $V_{LOG}$ of a log scale.

In operation S20, the pixel may generate an output voltage.

For example, an amplifier circuit of the pixel may amplify the amount of change in the log voltage $V_{LOG}$ (or the source follower voltage $V_{SF}$ that has passed through a source follower) for a certain period of time to generate an output voltage $V_{OUT}$. The amplifier circuit of the pixel may be implemented as having a negative gain, such that when the log voltage $V_{LOG}$ (or the source follower voltage $V_{SF}$ that has passed through the source follower) increases (i.e., when the intensity of light increases), the output voltage $V_{OUT}$ decreases, and when the log voltage $V_{LOG}$ (or the source follower voltage $V_{SF}$ that has passed through the source follower) decreases (i.e., when the intensity of light decreases), the output voltage $V_{OUT}$ increases.

In operation S30, the pixel may identify whether an event occurs. A comparator circuit of the pixel may include a first comparator circuit for detecting an ON event of the pixel and a second comparator circuit for detecting an OFF event of the pixel.

For example, when it is identified that an event (e.g., an ON event or an OFF event) occurs in the pixel in one frame, the pixel may perform operation S40.

For example, when it is identified that an event (e.g., an ON event or an OFF event) has not occurred in the pixel in one frame, the pixel may return to operation S10.

For example, when the output voltage $V_{OUT}$ is lower than the first threshold voltage VTH1, the first comparator circuit may identify that an ON event occurs in the pixel, and may generate an ON event signal. When the output voltage $V_{OUT}$ is higher than the second threshold voltage VTH2, the second comparator circuit may identify that an OFF event occurs in the pixel and may generate an OFF event signal. The first threshold voltage level VTH1 may be the same as or different from the second threshold voltage level VTH2.

In operation S40, the pixel may count the amount of change in illumination for the event and perform self-reset. The counter of the pixel may include a first event counter counting the amount of change in illumination for an ON event and a second event counter counting the amount of change in illumination for an OFF event.

For example, the first event counter may increase the first count value whenever the ON event signal is received. In this case, the first count value may refer to a value for representing the amount of change in illumination for the ON event.

For example, the second event counter may increase the second count value whenever the OFF event signal is received. In this case, the second count value may refer to a value representing the amount of change in illumination for the OFF event.

For example, when the count value reaches the maximum count value MAX, the first event counter and the second event counter may not increase the count value but maintain a previous count value even if the ON event signal or the OFF event signal is received. An embodiment of counting the amount of change in illumination that has caused the event is described with reference to FIG. 5 below.

The pixel may perform self-reset.

For example, a reset circuit (e.g., the self-reset circuit) of the pixel may be located inside the pixel and/or be configured as part of the pixel. When an ON event or an OFF event occurs, the reset circuit may reset the pixel by generating a reset signal RST itself in response to the occurrence of an event signal, without receiving a control signal (e.g., reset signal) from an external device.

For example, when either the ON event signal or the OFF event signal occurs, the reset circuit may transmit the reset signal RST to the amplifier circuit to activate the switch of the amplifier circuit, thereby resetting the pixel by itself.

For example, when the switch of the amplifier circuit of the pixel is activated, the output voltage $V_{OUT}$ may be reset as voltages across the differentiator amplifier of the amplifier circuit become the same. The differentiator amplifier of the amplifier circuit may amplify the amount of change in the log voltage $V_{LOG}$ (or the source follower voltage $V_{SF}$) for a next event to occur from a time point at which the output voltage $V_{OUT}$ is reset according to the reset signal RST. The pixel may be switched to a standby state in which it is possible to identify whether a next event occurs.

The pixel may be configured to detect whether an event occurs until receiving a scan signal SEL from an external device, and may repeatedly perform counting of the amount of change in illumination when an event occurs.

In operation S50, the pixel may transmit output data including information about the amount of change in illumination of the event to the external device.

For example, in response to the scan signal SEL received from an external device (e.g., the readout circuit), the pixel may transmit output data including information (e.g., a count value) on the amount of change in illumination that has caused each event to the external device. The output data may include data having an N-bit (N: positive integer) size in order to express the amount of change in illumination for the event together with the occurrence of the event.

The pixel of the vision sensor according to an embodiment may be implemented in a form including the reset circuit and the counter inside the pixel. In an embodiment, the pixel may perform an immediate pixel reset using the reset circuit inside the pixel and count the amount of change in illumination for an event (e.g., an ON event or an OFF event) occurring during one frame period.

Figure 5:
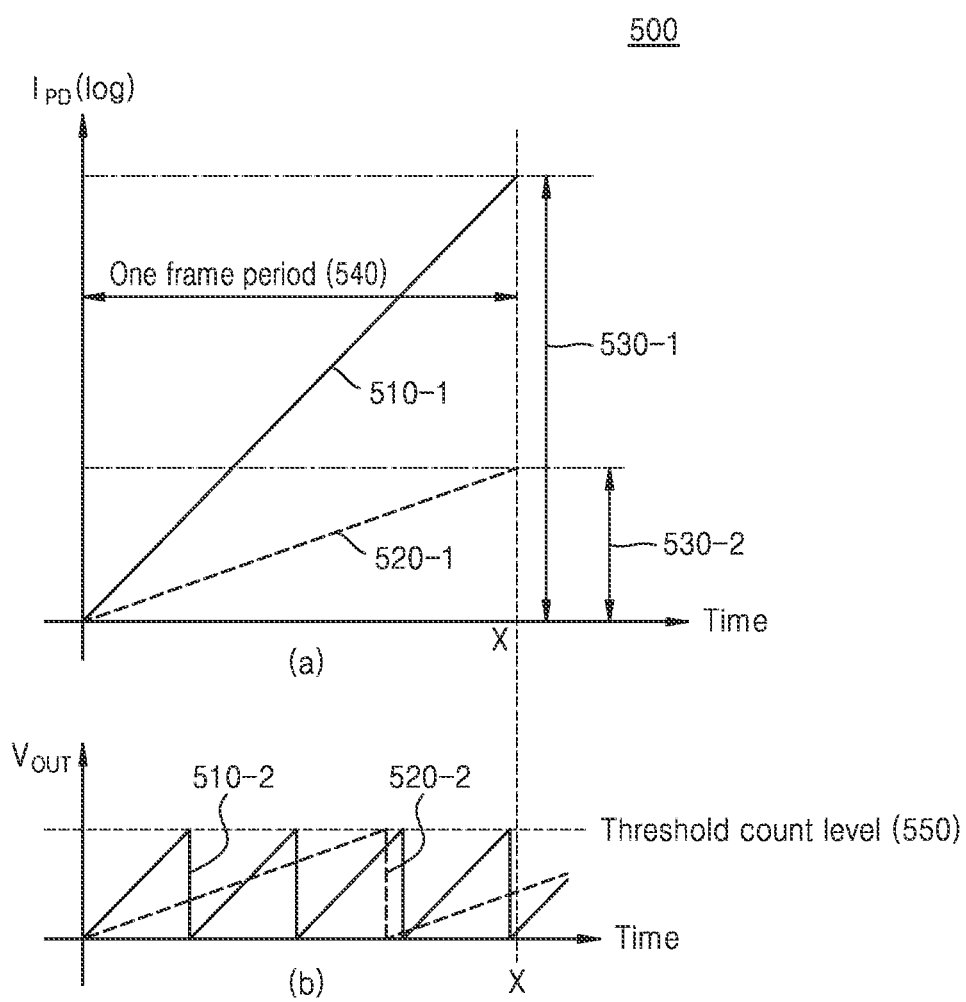
FIG. 5 is a diagram illustrating an operation of identifying a change in illumination for an event according to an embodiment.

FIG. 5 is a diagram illustrating an operation 500 of identifying a change in illumination for an event according to an embodiment.

FIG. 5 illustrates a counting operation for the amount of change in illumination that has caused an event performed by the counter of the pixel 303 of FIG. 3A.

Referring to FIGS. 3A and 5, in graph (a), the horizontal axis may represent a time domain and the vertical axis may represent a log scale of the current $I_{PD}$ generated by the photoelectric transformation element of the pixel 303. In graph (b), the horizontal axis may represent a time domain and the vertical axis may represent an output voltage $V_{OUT}$ region of the amplifier circuit 313.

The graphs (e.g., 510-1 and 510-2) indicated by the solid lines in graphs (a) and (b) may represent graphs of the current $I_{PD}$ and the output voltage $V_{OUT}$ for a first event, and the graphs (e.g., 520-1 and 520-2) indicated by the dashed lines may represent graphs of the current $I_{PD}$ and the output voltage $V_{OUT}$ for a second event. The first event and the second event occurring during one frame period X 540 may be OFF events and an event counter may be a 2-bit counter (e.g., provided that the amplifier circuit of the pixel is implemented to have a negative gain). The amount of change in illumination for each event may be the amount of change in illumination that has caused each event, and may be indicated by the amount of change in the current $I_{PD}$ or the output voltage $V_{OUT}$.

As shown in graph (a) of FIG. 5, in the case of the first event, the amount of change in illumination for the first event may be represented by the amount of change 530-1 of the first $I_{PD}$. In addition, in the case of the second event, the amount of change in illumination for the second event may be represented by the amount of change 530-2 of the second $I_{PD}$.

For example, the pixel may convert the current $I_{PD}$ of graph (a) into the output voltage $V_{OUT}$ of graph (b) based on the current-to-voltage converter and the amplifier circuit.

For example, the pixel may increase a count value each time the amount of change (e.g., 510-2 and 520-2) in the converted output voltage $V_{OUT}$ reaches a threshold count level 550, based on the comparator circuit and the counter. In addition, the pixel may self-reset the output voltage $V_{OUT}$ without an external signal after reaching the threshold count level, based on the reset circuit. That is, the pixel may indicate the amount of change in illumination that has caused the event as a count value, based on a comparison result between the output voltage $V_{OUT}$ of the event and the threshold count level.

As shown in graph (b) of FIG. 5, in the case of the first event, the amount of change in the output voltage $V_{OUT}$ 510-2 due to the first event may reach the threshold count level a total of four times during one frame period 540, and thus, the amount of change in illumination for the first event may be represented by a first count value (e.g., 11 (in the case of a 2-bit counter)) by increasing the count value for the first event by 4 times.

In the case of the second event, the amount of change in the output voltage $V_{OUT}$ 520-2 due to the second event may reach the threshold count level a total of once during one frame period 540, and thus, the amount of change in illumination for the second event may be represented by a second count value (e.g., 01 (in the case of the 2-bit counter)) by increasing the count value for the second event by one time.

As described above, the pixel according to an embodiment may indicate not only the occurrence of events, but also the amount of change in illumination for each event by a relative numerical value (e.g., a count value). Therefore, the pixel according to an embodiment may provide a vision sensor capable of effectively processing detected events in image processing by comparing the amounts of change in illumination for the events detected within a frame period.

Figure 6:
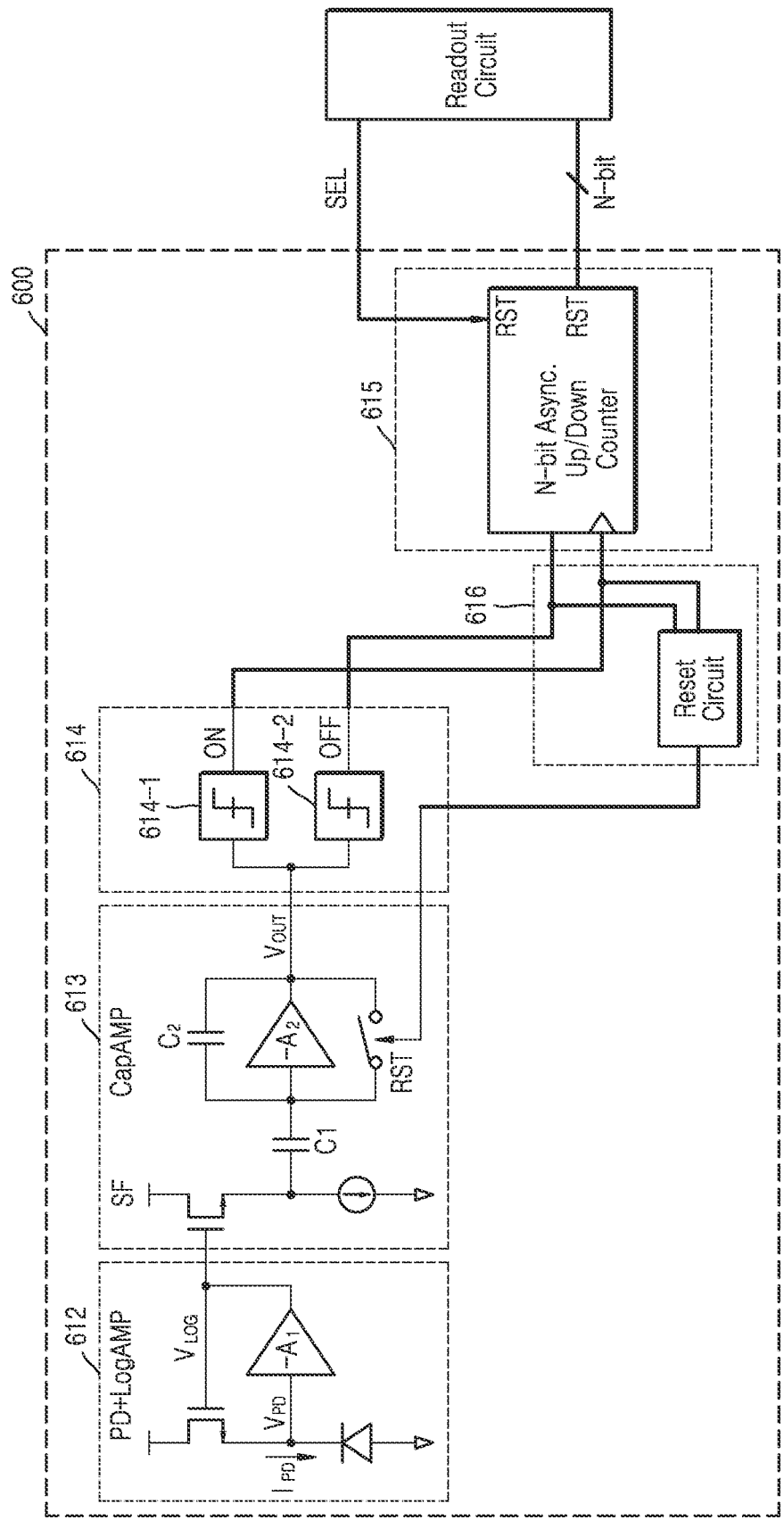
FIG. 6 is a diagram illustrating a pixel including an up-down counter according to an embodiment.

FIG. 6 is a circuit diagram illustrating a pixel 600 including an up-down counter according to an embodiment.

Referring to FIG. 6, the pixel 600 may include a current-to-voltage converter circuit 612 including a photoelectric transformation element, an amplifier circuit 613, a comparator circuit 614, a counter 615, and a reset circuit 616.

The current-to-voltage converter circuit 612, the amplifier circuit 613, the comparator circuit 614, and the reset circuit 616 of FIG. 6 may be similar to the converter circuit 312, the amplifier circuit 313, the comparator circuit 314, and the reset circuit 316, respectively described at FIG. 3A, and thus repeated description may be omitted.

The counter 615 may hold and count the ON event signal and the OFF event signal output from the comparator circuit 614, and may output a counting result (e.g., count value) to an external device. Unlike FIG. 3A, the counter 615 of FIG. 6 may be configured as a single up/down counter increasing and decreasing a count value for an ON/OFF event.

For example, the counter 615 may receive an ON event signal output from a first comparator 614_1 as a signal for increasing a count value, and receiving an OFF event signal output from a second comparator 614_2 as a signal for decreasing a count value.

For example, the counter 615 may count the count value of the counter 615 each time the ON event signal ON is received, and may count down the count value each time the OFF event signal OFF is received.

For example, in a case in which the maximum count value MAX is reached, even when the ON event signal or the OFF event signal is received, the counter 615 may not increase or decrease the count value and maintain a previous count value.

When the pixel 600 is scanned, the counter 615 may output counting result data (e.g., a final count value) based on the ON event signal and the OFF event signal. In this case, a difference between a first count value (a reset value) stored in the counter 615 and a final count value may refer to the amount of change in illumination that has caused the ON event and OFF event during one frame period.

The counter 615 may transmit output data (N bits) including final count values for the ON event and the OFF event to an external device (e.g., the readout circuit).

For example, as the counter 615 receives a control signal (e.g., SEL) from an external device, the counter 615 may transmit the output data (N bits) including the final count values for the ON event and the OFF event to an external device (e.g., the readout circuit), and the counter 615 may then be reset. In this case, a reset value of the counter 615 may refer to any one of a middle value and an average value between a maximum value and a minimum value of the count value.

The pixel 600 according to an embodiment may immediately reset the pixel when an event occurs using a reset circuit 616 (e.g., the self-reset circuit) in the pixel 600, and thus, distortion of an event occurrence time point and an output voltage due to latency of the reset signal may be prevented, and the amount of change in illumination for an event based on a reset state may be represented by a count value.

The pixel 600 of the vision sensor according to an embodiment may be implemented in a form including a reset circuit and an up/down counter inside the pixel. Since the pixel 600 may count the amount of change in illumination for an event (e.g., the amount of change in illumination that has caused an event) through the single up/down counter, the total size of the pixel 600 may be reduced, compared to a pixel including counters (e.g., the ON event counter 315-1 and the OFF event counter 315-2) of FIG. 3A, thereby saving hardware resources.

Figure 7:
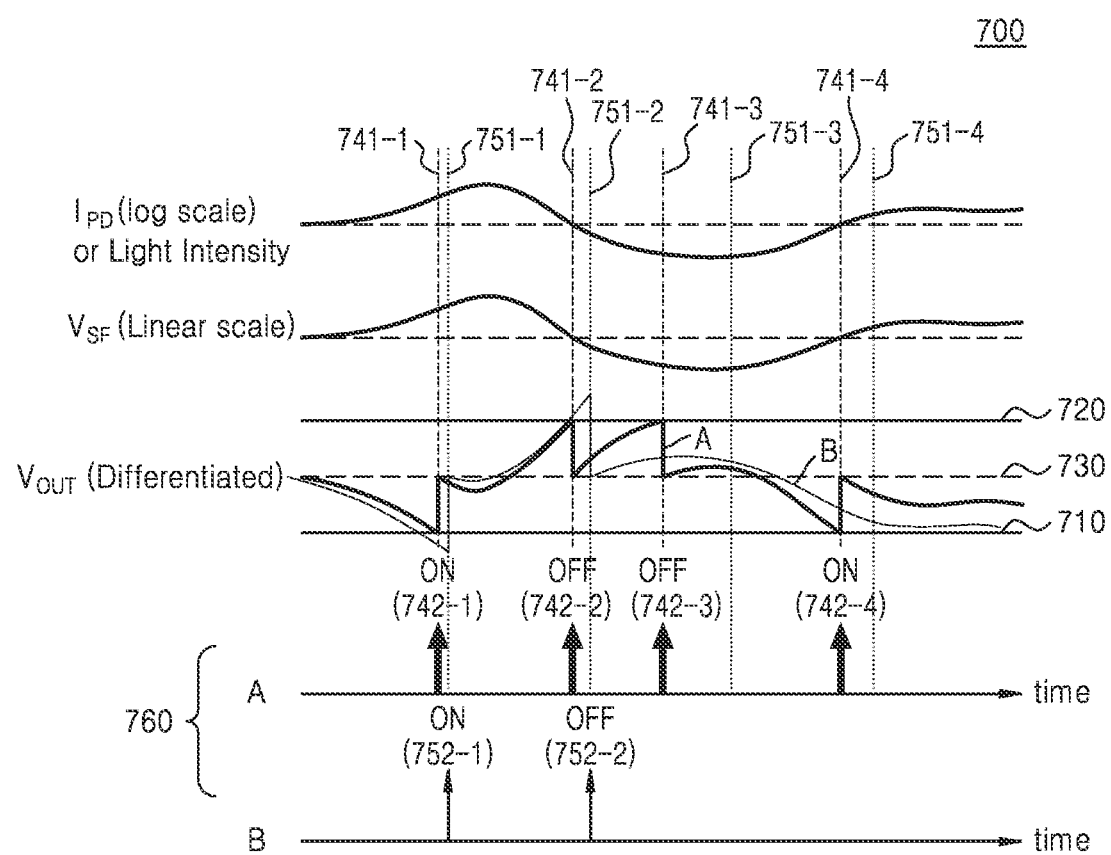
FIG. 7 is a diagram illustrating event detection performance comparison results for each pixel according to an embodiment.

FIG. 7 is a diagram illustrating event detection performance comparison results for each pixel according to an embodiment.

In FIG. 7, in order to compare the event detection performance of each pixel implemented to have a different structure, the horizontal axis represents a time domain, and the vertical axis represents the current $I_{PD}$ (log scale) indicating a change in brightness of light for an event, the source follower voltage $V_{SF}$ (linear scale), and the output voltage $V_{OUT}$, which are conversion data of the current $I_{PD}$.

FIG. 7 shows a comparison between event detection performance of a first pixel A in which the output voltage $V_{OUT}$ is reset based on a reset circuit (e.g., a self-reset circuit) inside the pixel and a second pixel B in which the output voltage $V_{OUT}$ is reset based on a reset circuit outside the pixel.

The actual event occurrence times in the first pixel A and the second pixel B may be a first event occurrence time point 741-1 to a fourth event occurrence time point 741-4, and a time point at which the reset signal RST is received from an external device in the second pixel B may be a first RST time point 751-1 to a fourth RST time point 751-4.

The results depicted in FIG. 7 are based on an assumption that the amplifier circuits of the first pixel A and the second pixel B are implemented to have a negative gain, and in the graph of the output voltages $V_{OUT}$ of the first pixel A and the second pixel B, a first threshold voltage level 710 may indicate a threshold voltage level of an ON event, a second threshold voltage level 720 may indicate a threshold voltage level of an OFF event, and a third threshold voltage level 730 may indicate a reset voltage level.

For example, referring to the arrow graphs 760 illustrating event occurrence time points detected for each pixel in FIG. 7, it event occurrence time points 742-1 to 742-4 detected by the first pixel A coincide with actual event occurrence time points (first event occurrence time point 741-1 to fourth event occurrence time point 741-4, respectively). The event occurrence time points 752-1 to 752-2 detected by the second pixel B coincide with only time points (first RST time point 751-1 and second RST time point 751-2) at which a reset signal is received from an external device but do not match the actual event occurrence time points (the first event occurrence time points 741-1 to fourth event occurrence time points 741-4).

In particular, in the case of the second pixel B, if latency occurs when receiving the reset signal RST from an external device (e.g., the readout circuit), distortion may occur in the output voltage $V_{OUT}$, and a serious error that an event is not detected at occurrence time points of next events (e.g., the third event occurrence time point 741-3 and the fourth event occurrence time point 741-4) may occur due to the influence of the distortion.

Therefore, the pixel (e.g., the first pixel A) according to an embodiment may include a reset circuit inside the pixel and perform self-reset through the reset circuit, thereby providing a vision sensor capable of preventing distortion of the event occurrence time point and the output voltage $V_{OUT}$ due to delay of the reset signal RST received from an external device and accurately measuring an event occurrence time point and the amount of change in illumination (the amount of change in the output voltage $V_{OUT}$) for an event.

Figure 8A:
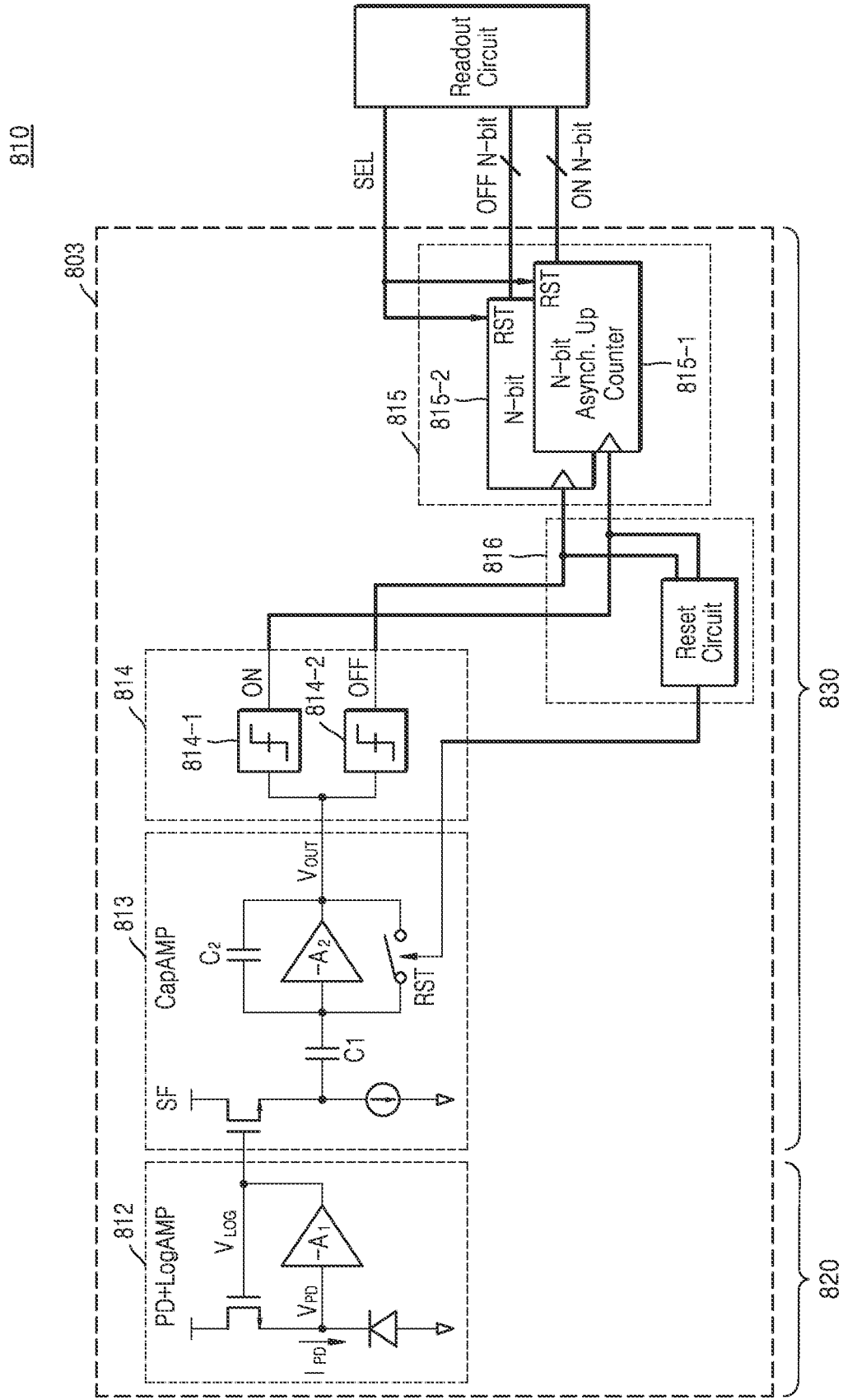
FIG. 8A is a diagram illustrating a structure of a two-stack pixel according to an embodiment.
Figure 8B:
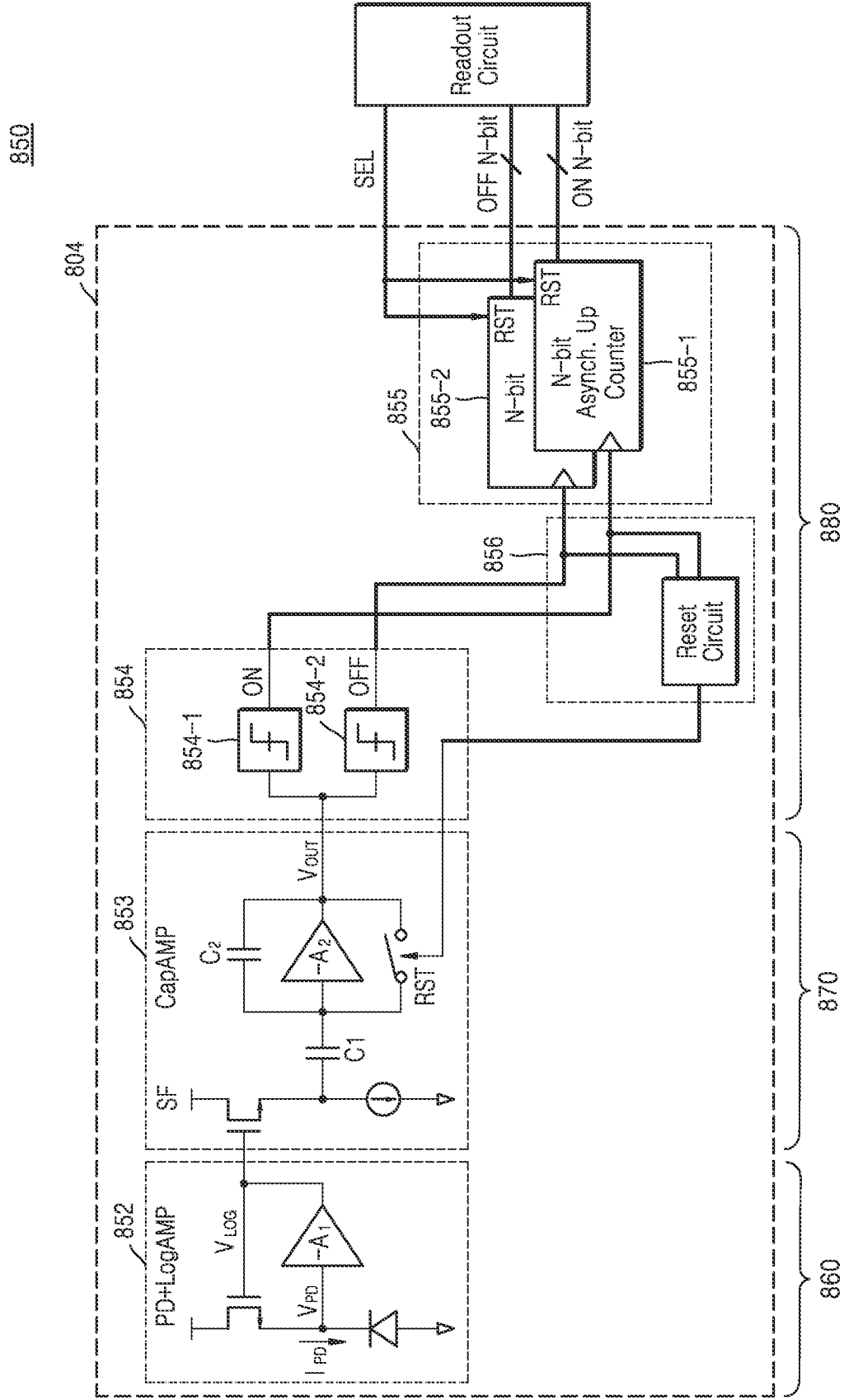
FIG. 8B is a diagram illustrating a structure of a three-stack pixel according to an embodiment.

FIG. 8A is a diagram illustrating a structure 810 of a 2-stack pixel according to an embodiment. FIG. 8B is a diagram illustrating a structure 850 of a 3-stack pixel according to an embodiment.

As an embodiment for reducing the size of the pixel, FIG. 8A illustrates the structure 810 of the 2-stack pixel, and FIG. 8B illustrates the structure 850 of the 3-stack pixel.

Referring to FIG. 8A, according to an embodiment, the pixel 803 may include a current-to-voltage converter circuit 812 including a photoelectric transformation element, an amplifier circuit 813, a comparator circuit 814 including a first comparator 814-1 detecting an ON event and a second comparator 814-2 detecting an OFF event, a counter 815 including a first counter 815-1 counting the amount of change in illumination for an ON event and a second counter 815-2 counting the amount of change in illumination for an OFF event, and a reset circuit 816.

According to an embodiment, the pixel 803 may be implemented in a two-stack structure including a first plate 820 and a second plate 830. The first plate 820 may include the current-to-voltage converter circuit 812 including a photoelectric transformation element, and the second plate 830 may include the amplifier circuit 813, the comparator circuit 814 (e.g., the first comparator 814-1 and the second comparator 814-2), the counter 815 (e.g., the first counter 815-1 and the second counter 815-2), and the reset circuit 816. In this case, the arrangement order of the two-stack between the first plate 820 and the second plate 830 may be determined according to the size of the pixel 803 and individual component circuits. For example, in the pixel 803, the first plate 820 may be disposed above the second plate 830 or the first plate 820 may be disposed below the second plate 830.

Referring to FIG. 8B, according to an embodiment, the pixel 804 may include a current-to-voltage converter circuit 852 including a photoelectric transformation element, an amplifier circuit 853, a comparator circuit 854 including a first comparator 854-1 detecting an ON event and a second comparator 854-2 detecting an OFF event, a counter 855 including a first counter 815-1 counting a change in illumination for an ON event and a second counter 855-2 counting the amount of change in illumination for an OFF event, and a reset circuit 856.

According to an embodiment, the pixel 804 may be implemented in a 3-stack structure including a first plate 860, a second plate 870, and a third plate 880. The first plate 860 may include the current-to-voltage converter circuit 852 including the photoelectric transformation element, the second plate 870 may include the amplifier circuit 853, and the third plate 880 may include the comparator circuit 854 (e.g., a first comparator 854-1 and a second comparator 854-2), the counter 855 (e.g., a first counter 855-1 and a second counter 855-2), and the reset circuit 856. In this case, the arrangement order of the 3-stack pixel, among the first plate 860, the second plate 870, and the third plate 880, may be determined according to a size of the pixel 804 and individual component circuits. For example, in the pixel 804, the first plate 860 may be disposed above the second plate 870, and the second plate 870 may be disposed above the third plate 880, or the first plate 860 may be disposed below the second plate 870, and the second plate 870 may be disposed below the third plate 880.

Figure 9:
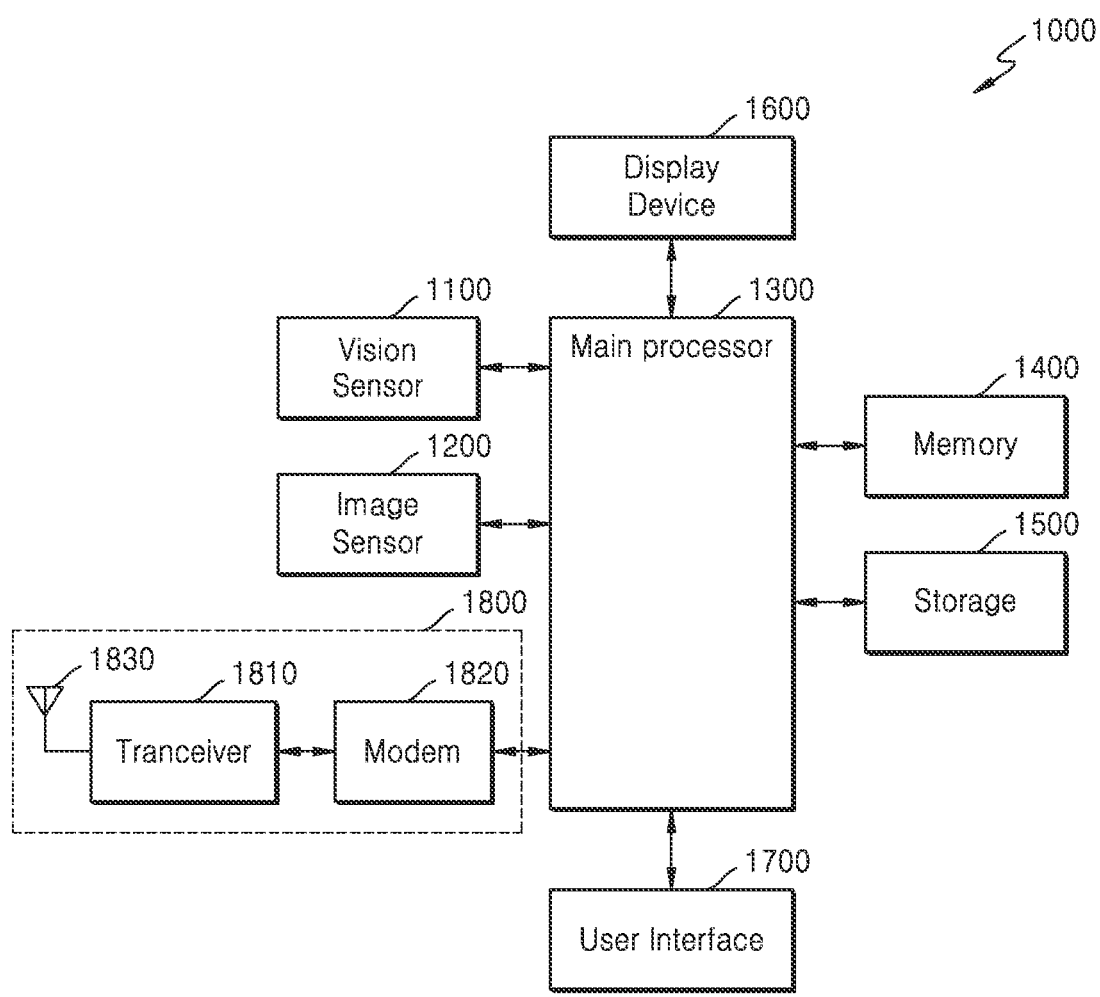
FIG. 9 is a block diagram illustrating an electronic device to which a vision sensor is implemented according to an embodiment.

FIG. 9 is a diagram illustrating an electronic device 1000 to which a vision sensor is applied according to an embodiment.

Referring to FIG. 9, the electronic device 1000 may include a vision sensor 1100, an image sensor 1200, a main processor 1300, a memory 1400, a storage 1500, a display device 1600, a user interface 1700, and a communication unit 1800. The disclosure is not limited thereto, and the electronic device 1000 may be implemented such that at least some of the aforementioned components are omitted or additional components are added.

The vision sensor 100 described above with reference to FIGS. 1 to 8B may be applied as the vision sensor 1100 and the image sensor 200 described above may be applied as the image sensor 1200.

The vision sensor 1100 may sense an object to generate event signals and transmit the generated event signals to the main processor 1300. In FIGS. 1 to 8B, the vision sensor 1100 may be a component included in the image sensor 1200, but the disclosure is not limited thereto, and the vision sensor 1100 according to an embodiment may function or operate as an independent sensor in the electronic device 1000 alone.

The image sensor 1200 may generate image data (e.g., raw image data) based on a received optical signal and provide the image data to the main processor 1300.

The main processor 1300 may control an overall operation of the electronic device 1000 and may detect movement of an object by processing event data (i.e., event signals) received from the vision sensor 1100. That is, the main processor 1300 may perform image processing on the movement of the object, based on whether an event occurs and data (e.g., a count value) on the amount of change in illumination for the event received from the vision sensor 1100. In the disclosure, the amount of change in illumination for an event may refer to the amount of change in illumination that has caused the event.

The memory 1400 may store data used for the operation of the electronic device 1000. For example, the memory 1400 may temporarily store packets or frames processed by the main processor 1300. The memory 1400 may temporarily store a frame including output data (e.g., information about whether an event occurs and data obtained by counting a change in illumination for the event) received from the vision sensor 1100.

For example, the memory 1400 may include volatile memories, such as dynamic random access memory (DRAM), synchronous dynamic RAM (SDRAM), and/or nonvolatile memories, such as phase-change RAM (PRAM), magneto-resistive RAM (MRAM), and resistive RAM (ReRAM), ferro-electric RAM (FRAM), and the like.

The storage 1500 may store data requested to be stored from the main processor 1300 or other components. The storage 1500 may include nonvolatile memories, such as flash memory, PRAM, MRAM, ReRAM, FRAM, and the like.

The display device 1600 may include a display panel, a display driving circuit, and a display serial interface (DSI). For example, the display panel may be implemented as various devices, such as liquid crystal display (LCD) devices, light emitting diode (LED) display devices, organic LED (OLED) display devices, and active matrix OLED (AMOLED) display devices. The display driving circuit may include a timing controller and a source driver necessary for driving the display panel. A DSI host built into the main processor 1300 may perform serial communication with the display panel through the DSI.

The user interface 1700 may include at least one of input interfaces, such as a keyboard, a mouse, a keypad, a button, a touch panel, a touch screen, a touch pad, a touch ball, a gyroscope sensor, a vibration sensor, and an acceleration sensor.

The communication unit 1800 may exchange signals with an external device/system through an antenna 1830. A transceiver 1810 and a modulator/demodulator (MODEM) 1820 of the communication unit 1800 may process signals exchanged with an external device/system according to wireless communication protocols, such as long term evolution (LTE), worldwide interoperability for microwave access (WIMAX), global system for mobile communication (GSM), code division multiple access (CDMA), Bluetooth, near field communication (NFC), wireless fidelity (Wi-Fi), radio frequency identification (RFID), etc.

Components of the electronic device 1000, for example, the vision sensor 1100, the image sensor 1200, the main processor 1300, the memory 1400, the storage 1500, the display device 1600, the user interface 1700, and the communication unit 1800 may exchange data with an external device, based on one or more of various interface protocols, such as universal serial bus (USB), small computer system interface (SCSI), MIPI, I2C, peripheral component interconnect express (PCIe), mobile PCIe (M-PCIe), advanced technology attachment (ATA), parallel ATA (PATA), serial ATA (SATA), serial Attached SCSI (SAS), integrated drive electronics (IDE), enhanced IDE (EIDE), nonvolatile memory express (NVMe), universal flash storage (UFS), etc.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A pixel of a vision sensor, the pixel comprising:
a photoelectric converter configured to convert an optical signal into a current;
a current-to-voltage converter configured to convert the current into a first voltage;
an amplifier configured to generate an output voltage by amplifying a voltage level of the first voltage;
at least one comparator configured to:
identify whether an event occurs based on comparing the output voltage with at least one threshold voltage, and
generate an event signal based on identifying that the event occurs; and
at least one counter configured to:
receive the event signal from the at least one comparator,
obtain a count value by counting the event signal as information about an amount of change in illumination, and
transmit output data comprising the count value.

2. The pixel of claim 1, further comprising:
a reset circuit connected to the at least one comparator and the amplifier,
wherein the reset circuit is configured to transmit, to the amplifier, a reset signal that resets the output voltage based on the event signal generated by the at least one comparator.

3. The pixel of claim 2, wherein the at least one comparator comprises:
a first comparator configured to identify whether an ON event of the pixel occurs; and
a second comparator configured to identify whether an OFF event of the pixel occurs.

4. The pixel of claim 3, wherein the at least one counter comprises:
a first counter configured to:
obtain a first count value by counting a first amount of change in illumination for the ON event;
output first output data comprising the first count value, and
a second counter configured to:
obtain a second count value by counting a second amount of change in illumination for the OFF event; and
output second output data comprising the second count value.

5. The pixel of claim 4, wherein the first comparator is further configured to transmit a first event signal to the first counter based on the output voltage reaching a first voltage level,
wherein the second comparator is further configured to transmit a second event signal to the second counter based on the output voltage reaching a second voltage level,
wherein the first voltage level corresponds to a first threshold voltage level of the ON event, and
wherein the second voltage level corresponds to a second threshold voltage level of the OFF event.

6. The pixel of claim 1, wherein the at least one counter is further configured to:
outputs the output data based on to a scan signal from an external device, and be reset after outputting the output data.

7. The pixel of claim 1, wherein the pixel comprises an upper plate and a lower plate stacked in a vertical direction,
wherein the photoelectric converter and the current-to-voltage converter are provided on the upper plate, and
wherein the amplifier, the at least one comparator, and the at least one counter are provided on the lower plate.

8. The pixel of claim 1, wherein the pixel comprises an upper plate, a middle plate, and a lower plate stacked in a vertical direction,
wherein the photoelectric converter and the current-to-voltage converter are provided on the upper plate,
wherein the amplifier is provided on the middle plate, and
wherein the at least one comparator and the at least one counter are provided on the lower plate.

9. An image processing device, comprising:
a vision sensor; and
an image sensor,
wherein the vision sensor comprises:
a photoelectric converter configured to convert an optical signal into an electrical signal;
an amplifier configured to generate an output voltage by amplifying the electrical signal;
at least one comparator configured to:
identify whether an event occurs based on comparing the output voltage with at least one threshold voltage, and
generate an event signal based on identifying that the event occurs; and
at least one counter configured to:
receive the event signal from the at least one comparator,
obtain a count value by counting the event signal as information about an amount of change in illumination, and
transmit output data comprising the count value.

10. The image processing device of claim 9, wherein the vision sensor further comprises a reset circuit configured to transmit a reset signal to the amplifier that resets the output voltage based on the generated event signal.

11. The image processing device of claim 10, wherein the event comprises an ON event and an OFF event, and
wherein the at least one comparator comprises:
a first comparator configured to identify whether the ON event occurs; and
a second comparator configured to identify whether the OFF event occurs.

12. The image processing device of claim 11, wherein the at least one counter comprises:
a first counter configured to:
obtain a first count value by counting a first amount of change in illumination for the ON event; and
output first output data comprising the first count value; and
a second counter configured to:
obtain a second count value by counting a second amount of change in illumination for the OFF event; and
output second output data comprising the second count value.

13. The image processing device of claim 12, wherein the first comparator is configured to transmit a first event signal to the first counter based on the output voltage reaching a first voltage level,
wherein the second comparator is configured to transmit a second event signal to the second counter based on the output voltage reaching a second voltage level,
wherein the first voltage level corresponds to a first threshold voltage level of the ON event, and
wherein the second voltage level corresponds to a second threshold voltage level of the OFF event.

14. The image processing device of claim 9, wherein the at least one counter is further configured to output the output data based on a scan signal from an external device, and be reset after outputting the output data.

15. The image processing device of claim 9, wherein the vision sensor comprises a pixel,
wherein the pixel of the vision sensor comprises an upper plate and a lower plate stacked in a vertical direction,
wherein the photoelectric converter is provided on the upper plate, and
wherein the amplifier, the at least one comparator, and the at least one counter are provided on the lower plate.

16. The image processing device of claim 9, wherein the vision sensor further comprises a pixel,
wherein the pixel of the vision sensor comprises an upper plate, a middle plate, and a lower plate stacked in a vertical direction,
wherein the photoelectric converter is provided on the upper plate,
wherein the amplifier is provided on the middle plate, and
wherein the at least one comparator and the at least one counter are provided on the lower plate.

17. A pixel of a vision sensor, the pixel comprising:
a photoelectric converter configured to convert an optical signal into a current;
a comparator configured to:
identify whether an event occurs based on comparing an output voltage corresponding to the current with at least one threshold voltage level, and
generate an event signal based on identifying that the event occurs; and
a reset circuit configured to reset the output voltage based on the event signal being generated,
wherein the event signal comprises an ON event signal and an OFF event signal.

18. The pixel of claim 17, further comprising:
an up-down counter configured to:
increase a count value based on the ON event signal being received, =decrease the count value based on the OFF event signal being received, and output a final count value as data corresponding to an amount of change in illumination.

19. The pixel of claim 17, further comprising:
a plurality of counters configured to:
increase a first count value based on the ON event signal being received,
increase a second count value based on the OFF event signal being received, and
output data comprising the first count value and the second count value,
wherein the first count value comprises information about a first amount of change in illumination for an ON event, and
wherein the second count value comprises information about a second amount of change in illumination for an OFF event.

20. The pixel of claim 17, wherein the pixel comprises an upper plate and a lower plate stacked in a vertical direction,
wherein the photoelectric converter is provided on the upper plate, and
wherein the comparator and the reset circuit are provided on the lower plate.

* * * * *